Jan. 11, 1966 C. F. BONILLA ETAL 3,229,096
SHIPPING CONTAINER FOR SPENT NUCLEAR REACTOR FUEL ELEMENTS
Filed April 3, 1963 4 Sheets-Sheet 4

INVENTORS
CHARLES F. BONILLA,
KARL R. BROWN, Jr.
& STEVEN H. BROWN
BY Robert L. Lehman
AGENT

United States Patent Office 3,229,096
Patented Jan. 11, 1966

3,229,096
SHIPPING CONTAINER FOR SPENT NUCLEAR REACTOR FUEL ELEMENTS
Charles F. Bonilla, Tenafly, Karl P. Brown, Jr., Metuchen, and Steven H. Brown, Montclair, N.J., assignors to National Lead Company, New York, N.Y., a corporation of New Jersey
Filed Apr. 3, 1963, Ser. No. 270,212
23 Claims. (Cl. 250—108)

The present invention relates to a new and novel container for fuel elements, and more particularly to a shipping container for spent fuel elements utilized in nuclear reactors and the like.

The present invention is particularly directed to a container utilized for shipping irradiated nuclear fuel elements, these containers normally being mounted on railroad cars and the like for transport from one location to another.

It is, of course, of primary importance in this type of shipping container to provide an arrangement which incorporates the necessary safety factors to prevent radiation damage to personnel who may work in contact with or around the container, and furthermore, it is important that the container retain the fuel elements in proper shielded position therewithin even when the container is subjected to rough handling, bumping, and shocks which may occur thereto in transport on railway cars and the like.

In addition to providing the desired and necessary degree of safety in transporting these types of fuel elements, it is a particular feature of the present invention to provide a shipping container which results in the greatest degree of economy so as to reduce the shipping costs. These costs are substantial in many instances due to the large bulk of the container required for transmitting a certain number of fuel elements with the necessary degree of safety.

The present invention incorporates a unique arrangement wherein the configuration of the fuel elements is utilized to provide a maximum economy of space. This is accomplished by utilizing the inherent nesting ability of the fuel elements, which may be placed in such a relationship as to be in close contacting nested relationship in order to occupy a minimum space when disposed in rows in such an arrangement. The container of the present invention enables the fuel elements to be nested in rows and thereby more elements can be mounted in a given area within the container so as to substantially reduce the freight cost.

The interior construction of the container is also such that means is provided for supporting the fuel elements in proper position and for controlling accidental criticality and not interfering with adequate heat conduction from the fuel elements to the walls of the container. It is, of course, important when the fuels are nested in close relationship that means be provided to ensure an effective transfer of heat from the fuel elements, and additionally, means must be provided for limiting the amount of neutron radiation between different rows of fuel elements.

The present invention incorporates separator plates which divide the interior of the container into a plurality of spaces for receiving fuel elements, these separator plates being formed of neutron absorbing material and also being good heat conductors to thereby accomplish the dual purpose of preventing criticality and providing a good path of heat transfer to the walls of the container.

A particular feature of the present invention is the utilization of an air cooling system, or in other words, the fuel cells are suspended in air within the container, the interior of the container being specifically designed so as to permit adequate heat transfer when utilizing air as a cooling medium. This is in contrast to prior art arrangements wherein fuel elements have commonly been suspended in water or a suitable fluid within the container, the water serving as a cooling medium. Such water cooled systems have suffered from the inherent disadvantages of presenting a leakage problem and also affording the possibility that the cooling medium may freeze at reduced temperatures with partial loads. It is apparent that the air cooling system of the present invention will eliminate these hazards which are present with water cooled systems.

The present invention also incorporates means for removing excessive air pressures from the interior of the container, the venting means for removing such pressure also incorporating a filter means for preventing undesired contamination by the discharged air. In addition, venting means is provided in the form of drain means for removing water from the interior of the container after the container has been loaded in a pool operation. With this drain means, the container of the present invention can be utilized equally well in either pool or dry cell operations or other properly shielded loading facilities as is well known in the art.

The present invention also incorporates additional safety features including means for preventing damage to the container in case of excessive heat and pressure developed in the container.

The present invention also incorporates an arrangement whereby the apparatus is adapted to carry fuel elements which have failed or ruptured, space being provided within the body means for receiving such fuel elements which are jacketed in a closed container with its own vent complete with particulate filter.

An object of the present invention is to provide a new and novel shipping container for radioactive fuel elements which meets all the present standards of safety for this type of shipping.

Another object of the invention is the provision of a container for fuel elements which permits nesting of the fuel elements to enable fitting more elements in a given area to thereby reduce the shipping cost.

A further object of the invention is to provide a container for fuel elements including means for supporting the fuel elements in proper position and for controlling accidental criticality while providing for and not interfering with adequate heat conduction and heat transfer from the elements to the walls of the container and thence to atmosphere.

Still another object of the invention is the provision of a container for fuel elements incorporating an air cooling system to eliminate problems of leakage and freezing with partial loads as has been encountered in water cooled systems.

Still a further object of the invention is the provision of a container for fuel elements incorporating venting means for removing excess air pressures and for removing water from the interior of the container.

Yet another object of the invention is to provide a container for fuel elements which can be utilized either in pool or dry cell operations or other properly shielded loading facilities and which incorporates safety features to prevent damage to the container in case of excessive heat and pressure developed within the container.

Still another object of the invention is the provision of a container for fuel elements which is capable of carrying fuel elements which have failed and which are jacketed in a closed container.

Still a further object of the invention is to provide a container for fuel elements which is simple and inexpensive in construction and yet which is rugged and reliable in use and which may be shipped economically.

Other objects and many attendant advantages of the invention will become more apparent when considered in connection with the specification and accompanying drawings, wherein.

Figure 1:
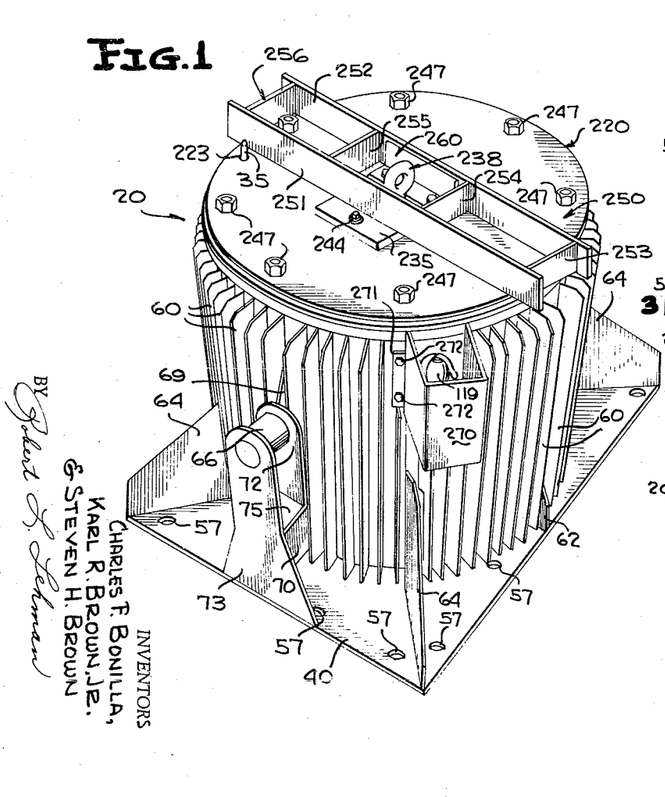
FIG. 1 is a top perspective view of the container of the present invention illustrating the apparatus in assembled relationship ready for shipping.
Figure 2:
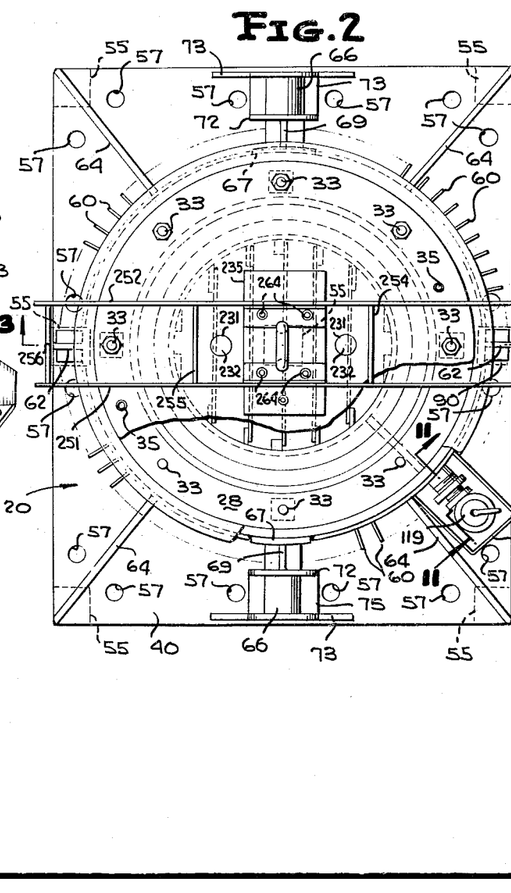
FIG. 2 is a top view of the container shown in FIG. 1 partially broken away to illustrate certain details and with certain components removed for the purpose of illustration.
Figure 3:
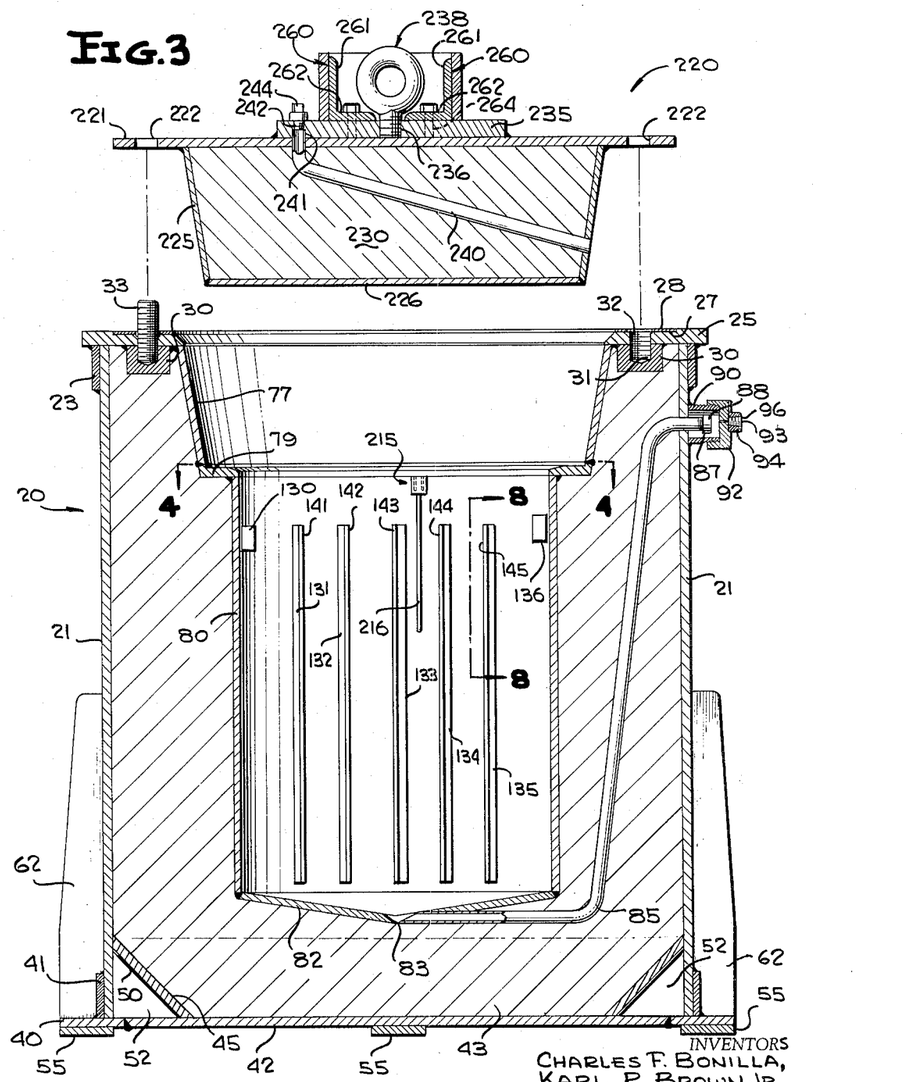
FIG. 3 is a vertical section through the container taken substantially along line 3—3 of FIG. 2 with the closure means rotated 90° for the purpose of illustration.

Referring now to the drawings wherein like reference characters designate corresponding parts throughout the several views, the construction of the container of the present invention may be most clearly understood from an inspection of FIGS. 1 through 3.

It will be understood that the components of the present invention as described throughout are of heavy duty construction being formed of steel or the like so as to readily withstand the loads applied thereto and to contain the lead shielding for the fuel elements.

The container of the present invention includes a body means indicated generally by reference numeral 20 which includes a substantially cylindrical side wall portion 21 having a cylindrical ring-like member 23 secured about the upper end thereof for reinforcing this portion. An annular plate 25 is secured as by welding to the upper portion of member 23 and rests on the upper edges of members 21 and 23. The upper surface of member 25 is provided with a circumferentially extending recess 27 which receives an annular gasket 28 for providing a good seal with the under surface of the closure means hereinafter described.

A plurality of equally spaced blocks 30 being 8 in number in the present example are secured as by welding to the under surface of annular plate 25, each of blocks 30 having a threaded opening 31 formed therein which is aligned with a threaded opening 32 provided through plate 25. A plurality of threaded studs 33 which are also 8 in number are threaded into place within these aligned openings and then tack-welded into operative position. These studs serve as attaching means for securing the closure means in operative position.

A pair of guide pins 35 are also supported by plate 25 and extend upwardly therefrom for reception in suitable guide openings provided in the closure means for initially guiding the closure means into proper relationship to receive the threaded studs as will be hereinafter more clearly described.

Figures 7, 9, 10, 11, 12, 13, 14, 15:
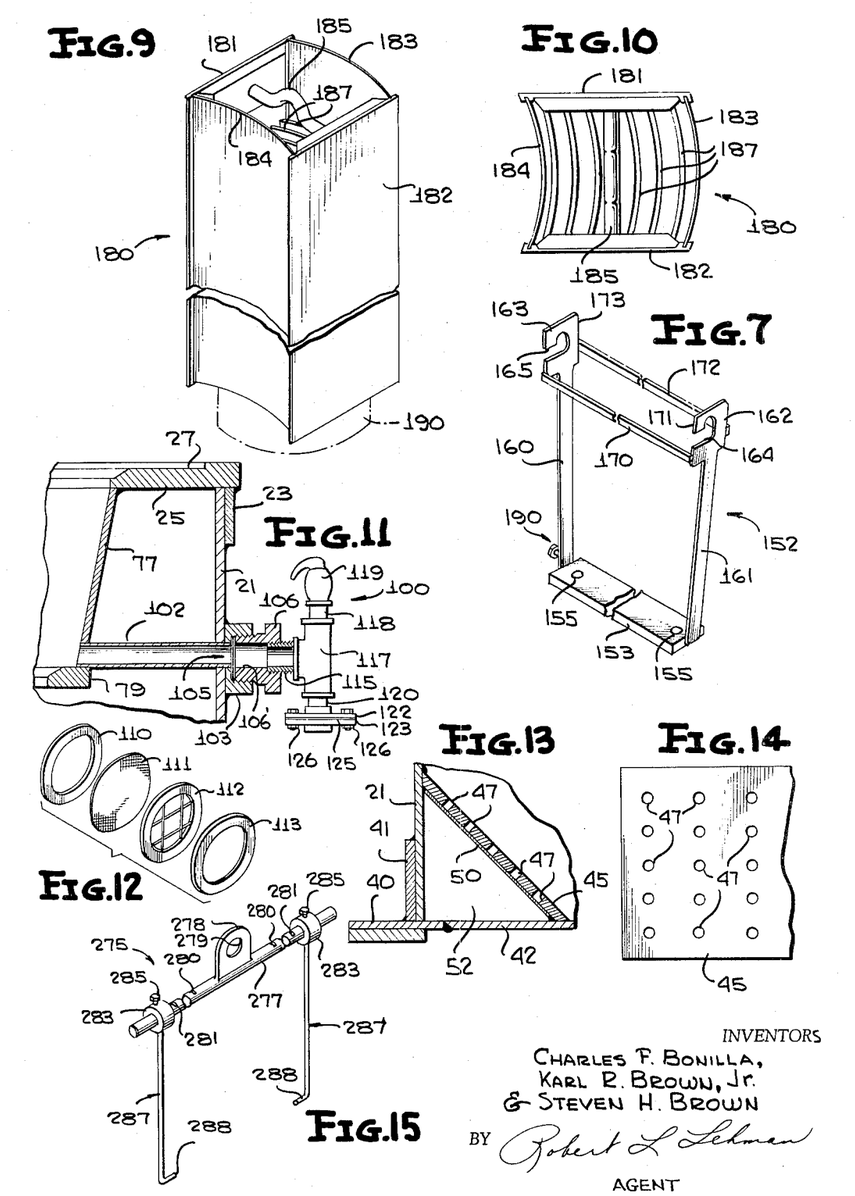
FIG. 7 is a top perspective view of the fuel element support means of the present invention.
FIG. 9 is a top perspective view of a fuel element designed to be shipped within the invention container.
FIG. 10 is a top view of the fuel element shown in FIG. 9.
FIG. 11 is a sectional view taken substantially along line 11—11 of FIG. 2 looking in the direction of the arrows.
FIG. 12 is an exploded perspective view of a typical filter assembly incorporated in the pressure relief vent means shown in FIG. 11.
FIG. 13 is an enlarged sectional view through a portion of the body means of the invention and illustrating the details of construction of a safety feature of the body means.
FIG. 14 is an elevational view illustrating the construction of one of the plate means illustrated in FIG. 13.
FIG. 15 is a top perspective view of a fixture utilized for lifting and lowering the fuel element support means of the present invention.

Referring to the lower portion of the body means, an annular member 40 is secured as by welding to a ring-like member 41 which surrounds the lower portion of side wall member 21 and is secured as by welding thereto. A disc-like plug member 42 is in turn welded to the inner periphery of member 40, member 42 being welded in operative position after the interior of the body means has been filled with a body of lead indicated by reference numeral 43. A safety means to protect the container and prevent damage to the body means thereof in case of excessive heat and pressure within the container which might tend to melt the body of lead 43 is provided in the form of a substantially frusto-conically shaped expansion plate 45 which as seen in FIGS. 13 and 14 is provided with a plurality of spaced holes 47 formed therethrough. Plate 45 is secured as by welding to the inner surface of side wall member 21. A relatively thin frangible plate 50 is seal-welded around the edges thereof to the plate 45, and the space 52 defined between plate 50, the inner surface of side wall 21, and the upper portions of members 40 and 42 comprises a void space. This in effect is an expansion chamber such that the body of lead 43 within the body means may expand through the holes 47 in plate 45 causing plate 50 to rupture whereupon the lead can flow into the void space thereby providing a safety feature as will be well understood.

A plurality of pad members 55 shown as being 9 in number as seen particularly in FIG. 2 are fixed to the under surface of member 40 and to the central portion of member 42 for supporting the body means on any suitable supporting surface.

A plurality of holes 57 are provided through member 40 for assisting in tieing the base portion of the body means down when shipping the container. In order to facilitate efficient heat transfer from the body means to the surrounding atmosphere, a plurality of vertically extending fin members 60 are secured as by welding to the outer surface of the side wall portion 21 of the body means.

A pair of diametrically opposite reinforcing plates 62 are secured between member 40 and the outer surface of the side wall 21 of the body means, and four spaced reinforcing plates 64 extend inwardly from the four corners of plate 40 to the outer surface of the side wall portion 21 of the body means for further rigidifying the structure and providing a rigid interconnection between the base plate portion 40 and the side wall of the container.

Lifting means is provided for the body means in the form of substantially cylindrical trunnion portions 66 which extend inwardly and are rigidly affixed as by welding to support portions or plates 67 which are in turn secured as by welding to the outer surface of the side wall of the body means. Each of the trunnions is reinforced by a vertically extending plate 69 secured to the outer surface of the body means above the trunnions and a vertical plate 70 extending below the trunnions and also secured to the outer surface of the body means.

Additional reinforcing and strengthening structure for the trunnions includes inner and outer plate means 72 and 73 which are disposed in spaced parallelism with one another and which have openings formed therethrough within which the trunnions are received and secured in place, plate means 72 and 73 being interconnected by horizontally extending plate members 75. It is apparent that the over-all arrangement of the various reinforcing members interconnected with the trunnions serve to provide a very sturdy and rigid interconnection whereby the trunnions may be engaged by suitable lifting mechanism for raising and lowering the entire apparatus of the present invention.

Referring now to FIG. 3 of the drawing, the details of construction of the means defining the cavity within the body means may be most clearly seen. A substantially frusto-conically shaped plate 77 tapers downwardly and inwardly as seen in this figure, and is secured as by welding to the undersurface of member 25. An annular member 79 is in turn secured as by welding to the lower end of plate 77, and a substantially cylindrical member 80 is secured as by welding to the undersurface of member 79 and depends therefrom.

Member 77 defines what may be referred to as the closure receiving portion of the cavity within the body means while cylindrical member 80 defines what may be termed the storage portion of the cavity within the body means.

A lower wall portion 82 is secured as by welding to the lower end of cylindrical member 80 and tapers downwardly to an apex portion 83 which represents the lowermost portion of the cavity within the body means. The body means incorporates a vent or drain means including a drain conduit 85 which as seen in FIG. 3 is in communication with the lowermost portion of the cavity within the body means and extends upwardly and outwardly through the body of lead within the body means to terminate in an outer end 87 which is illustrated as having a closure member 88 threaded onto the threaded end portion thereof. Cap member 88 may be selectively removed as desired which will hereinafter more fully be explained.

The outer end 87 of conduit 85 is surrounded by a cylindrical portion 90 secured as by welding to the outer surface of the side wall of the body means, member 90 extending outwardly beyond the end of conduit 85 and being threaded on the outer surface thereof. A cup-shaped adaptor member 92 is provided with internal threads and is threaded on cylindrical member 90, member 92 being provided with a central metering orifice 93 formed therethrough. An outwardly extending member 94 is secured to the outwardly facing surface of member 92 and is provided with a standard garden hose thread on the inner central bore formed therethrough for a purpose hereinafter described.

Referring now to FIGS. 11 and 12 of the drawing, a second vent means of the present invention which provides a pressure relief means is illustrated generally by reference numeral 100, this vent means including a conduit 102 the inner end of which is in communication with the closure receiving portion of the cavity within the body means and the outer end of which terminates within a filter housing fitting 103 suitably secured as by welding to the outer surface of the side wall 21 of the body means.

A filter assembly 105 is disposed within the filter housing fitting and retained in operative position by means of a filter and gasket retaining fitting 106 one end of which is threaded and which is received within a correspondingly formed internal thread on the filter housing 103, whereby the filter assembly may be clamped in the operative position shown in FIG. 11.

Referring now to the exploded view illustrated in FIG. 11, an upstream gasket 110 is provided, a disc-like piece of filter paper 111 seating against the annular gasket 110. A back-up screen 112 which may be formed of a rigid material such as steel or the like in turn seats against the opposite side of the filter paper 111, and a downstream annular gasket 113 is provided for seating against back-up screen 112 and the inner end of fitting 106.

The two gaskets may be formed of suitable material such as neoprene rubber and the like for providing a good seal with the remaining components of the filter assembly. The piece of filter paper 111 will serve to eliminate contamination of the surrounding atmosphere when gas is vented from the interior of the body means by the vent assembly 100.

The internal central bore 106' formed through fitting 106 is provided with internal threads which receive the external threads on a nipple 115 which in turn is connected with a T-fitting 117. One of the outlet portions of fitting 117 is connected through the intermediary of a nipple 118 with a pressure relief valve 119 which may be set to automatically open at a suitable pressure such as 5 p.s.i. This valve may also be manually tripped to vent the interior of the body means to atmosphere as desired as will be hereinafter explained.

The other outlet portion of the T-fitting 117 is connected through the intermediary of a nipple 120 with a pair of mounting flanges 122 and 123 which are adapted to clamp therebetween a rupture diaphragm 125, the two mounting flanges being clamped together by means of cap screw and nut assemblies 126. The rupture diaphragm 125 may be formed of any suitable material such as aluminum foil and may be of such a thickness as to rupture at predetermined pressure such as 15 p.s.i. to serve as a safety feature for preventing excessive pressures from developing within the body means in case the pressure relief valve 119 can not efficiently vent excess pressures developed within the body means.

Figures 4, 5, 6, 8:
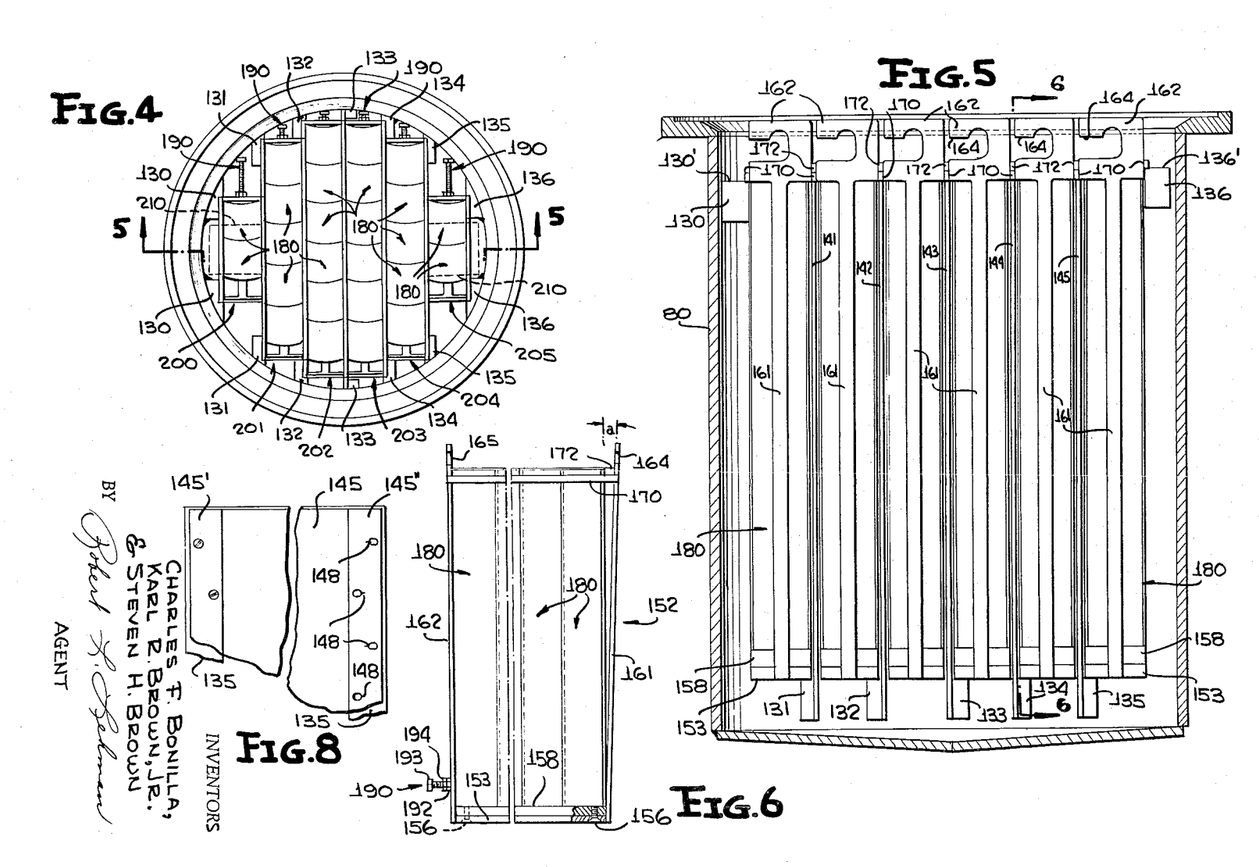
FIG. 4 is a view looking down substantially along line 4—4 of FIG. 3 illustrating the disposition of the separator plates within the cavity of the body means and showing the fuel element support means in position within the cavity and with the fuel elements illustrated schematically within operative position in the fuel element support means.
FIG. 5 is a sectional view on an enlarged scale taken substantially along line 5—5 of FIG. 4 looking in the direction of the arrows.
FIG. 6 is an elevational view broken away and illustrating a typical fuel element support means of the present invention.
FIG. 8 is a broken away view illustrating a portion of the side edges of one of the separator plates of the present invention.

Referring now to FIGS. 3, 4 and 5, the construction and arrangement of the separator plate means of the present invention may be more clearly understood. A first pair of spaced separator plate support members 130 are formed at one side of the cavity, and a second similar pair of spaced support members 136 are disposed at the opposite side of the cavity. As seen in FIGS. 3 and 5, these support members have a relatively small vertical dimension while the upper surface 136' of support members 136 is at a higher vertical level than the upper surface 130' of support members 130 for a purpose hereinafter described.

Five pairs of separator plate support members 131, 132, 133, 134, and 135 are disposed at spaced intervals about the inner surface of wall 80, all of these support members being secured in place as by welding or the like, each pair of support members being disposed at opposite sides of the storage portion of the cavity and in alignment with one another as will be clearly evident from an inspection of FIG. 4. It will also be noted as seen particularly in FIG. 3 that the support members 131 through 135 inclusive have a substantial vertical dimension for supporting the separator plates substantially throughout their length.

A plurality of separator plates illustrated as being five in number are indicated by reference numerals 141 through 145 inclusive, each of these plates being supported between a pair of separator support members 131 through 135 inclusive respectively. Each of these separator plates is of substantially identical construction and a typical construction is illustrated in FIG. 8, wherein separator plate 145 is illustrated as having oppositely vertically extending edge portions 145' and 145". Each of these plates is of a construction referred to as a boral plate which comprises a sandwich consisting of boron carbide crystals in aluminum, with a cladding of commercially pure aluminum. To this central boral sandwich plate construction is secured opposite edge portions which may be for example formed of aluminum which is butt welded to the boral plate. The side edge portions of the separator plates are secured to the separator support members by suitable screw members, and in a typical illustration as shown in FIG. 8, the edge portion 145' may be drilled and countersunk for receiving flat-head screws while the other side portion 145' may be provided with holes which are slotted as indicated by reference numerals 148 about the center line of the hole to permit expansion and contraction movement of the separator plates. When attaching the side portion 145', a spring washer may be utilized adjacent to the edge portion and a screw then tightened up against the spring washer to hold the tension but not to clamp the plate too tightly. It is evident that each of the various separator plates may be provided with a similar arrangement to permit expansion and contraction of the separator plates as caused by the changes in temperature within the body means. It is within the purview of this invention also to employ a firm connection at each edge with the means for providing for thermal expansion disposed therebetween.

It is apparent from an inspection of FIG. 3 that the separator plates 141 through 145 inclusive divide the storage portion of the cavity within the body means into six spaces adapted to receive fuel elements. The fuel elements themselves are supported within suitable fuel element support means or baskets, one of these baskets being received within each of the spaces defined between the separator plates. The separator plates accordingly serve the function of controlling accidental criticality since they are formed of a good neutron absorbing material and at the same time these plates are good heat conductors so as to provide a good path of heat conduction from the fuel elements supported adjacent the plates to the separator support members which in turn are secured to the inner surface of the side wall portion 80 thereby providing a good path of heat conduction such that the heat may be dissipated from the interior of the cavity.

The fuel element support means of the present invention are six in number and are all of similar construction. As seen in FIGS. 6 and 7, each of the fuel element support means is indicated generally by reference numeral 152 and includes a substantially rectangular bottom support member 153 having a pair of spaced holes 155 formed therethrough, these holes being countersunk so as to receive flathead screws 156 therein, these flathead screws being adapted to be threaded into suitable threaded openings provided in a spacer means 158 if such spacer means should be necessary as hereinafter pointed out.

Extending upwardly from opposite ends of the bottom support member 153 are a pair of side members 160 and 161 which are rigidly secured to the bottom support member as by welding, the upper end portions 162 and 163 of the side members 161 and 160 being enlarged as seen particularly in FIG. 7 and having slots 164 and 165 which extend from one face thereof inwardly and thence upwardly for the purpose of receiving a suitable handling fixture for lifting and lowering the fuel element support means as hereinafter described.

A first support member or bar 170 is secured to one face 171 of the fuel element support means while a second support member or bar 172 is secured to the opposite face 173 of each of the side members, the support bars being suitably fixed to the opposite faces of the side members as by welding or the like.

The upper edge portion of each of the support bars 170 is disposed such that it is in substantially the same plane as the lower edge portion of the other support bar 172 of the fuel element support means such that when the fuel element support means are disposed in their stacked relationship as seen in FIG. 5, wherein the cavity within the body means is illustrated as fully loaded, the bars 172 of certain of the fuel element support means are adapted to rest upon the support bars 170 of the adjacent fuel element support means as will be clearly understood from an inspection of FIG. 5.

As seen in FIG. 5, it will be noted that support bar 172 of the fuel element support means at the righthand portion of FIG. 5 rests upon the upper surface 136' of support members 136. The support bars 170 of each of fuel element support means except the lefthandmost fuel element support means as seen in FIG. 5 rest upon the upper edge of one of the separator plates, while the support bar 170 of the lefthandmost fuel element support means as seen in FIG. 5 rests upon the upper surface 130' of support member 130.

It will be apparent from an inspection of FIG. 5 that the fuel element support means are adapted to be disposed within the spaces defined by the separator plates and assist in supporting one another through the intercooperation between the support bars thereof, the support bars serving at the same time to engage the upper portions of fuel elements disposed therewithin for retaining them in operative position. It will further be noted that the fuel element support means as seen for example in FIG. 7 is a substantially open framework so as to transport heat away from the fuel elements, and at the same time this framework effectively serves to hold the fuel elements in operative position therewithin.

Referring now to FIGS. 9 and 10, a typical fuel element which is adapted to be shipped in the container of the present invention is illustrated, the fuel element being indicated in its entirety by reference numeral 180 and including outer side plates 181 and 182 which are substantially flat and parallel with one another, these side plates being joined by arcuately shaped end plates 183 and 184 which as will be apparent permit the fuel cells to be nested together, or in other words the end wall 183 of one fuel element is adapted to be disposed adjacent the end wall of another fuel element 184 whereby the fuel elements may be stored in rows in nested relationship.

The fuel element includes a handle 185 and a plurality of inner fuel plates indicated by reference numerals 187. The fuel cell also normally includes an end fitting indicated in phantom line by reference numeral 190 in FIG. 9, and which is ordinarily cropped prior to placing the fuel element in the fuel element support means of the present invention.

Referring again to FIG. 6, a plurality of fuel elements 180 are illustrated in operative position within one of the fuel element support means 152 of the invention. It is important that the upper portions of the fuel elements as seen in FIG. 6 be engaged by the support bars 170 and 172 in order to retain the fuel elements in their proper operative position. In certain instances, when the fuel elements are cropped, the upper portions thereof as stored in the fuel element support means may be short or below the bars 170 and 172. In such a case, a spacer 158 is utilized on the upper surface of the bottom support member 153 of the fuel element support means in order to ensure that the upper portions of the fuel elements will engage the support bars 170 and 172 so as to prevent undesired lateral movement of the fuel elements.

As seen in FIG. 6, side member 161 of the fuel element support means is not parallel with side member 162, but rather is disposed at an angle indicated by a which may be on the order for example of 2½ degrees when the side member is of a height of approximately 30 inches. Accordingly, the fuel element support means may be said to have a straight side 162 and a slant side 161. The purpose of the slant side is to facilitate entry of the last fuel element in a particular fuel element support means as hereinafter described.

As seen particularly in FIG. 6, each of the fuel element support means is provided with adjustable wall engaging means indicated generally by reference numeral 190, each of these adjustable wall-engaging means including a nut 192 which is fixed as by welding to the side member 162, this nut receiving an adjusting bolt 193 which may be threaded in or out as desired, a locking nut 194 also being threaded on the adjusting bolt 193. It is apparent that the adjusting bolt 193 may be moved in or out to the desired position and then locked in operative position by means of a lock nut 194. Referring now to FIG. 4 of the drawing, the various fuel element support means of the present invention are illustrated. As shown in this figure, the fuel element support means are identified by reference numerals 200, 201, 203, 204 and 205. It will be noted that the fuel element support means 200 and 205 are adapted to receive support therein a pair of fuel elements 180, while fuel element support means 201 and 204 are adapted to receive and support therein five fuel elements, and the fuel element support means 202 and 203 in turn are adapted to receive and support six fuel elements therewithin. It is apparent that the fuel element support means may be designed to hold varying numbers of fuel elements, and that the arrangement shown is for the purpose of illustration only. It will also be noted in FIG. 4 that the adjustable wall engaging means have been arranged so as to engage the inner surface of the side wall 80 of the storage portion of the cavity so as to prevent side thrust.

As seen in FIG. 4, dotted lines 210 at the opposite sides of the cavity indicate the positions in which fuel elements which have been failed or ruptured and which are jacketed in a closed container with its own vent complete with particulate filter are disposed when it is desired to ship such elements. It will, of course, be understood that when such elements are to be shipped, the endmost fuel element support means 200 and 205 will be removed so that the elements 210 may be inserted in the position shown wherein the outer portions thereof fit between the support members 130 and 136 respectively. Referring again to FIG. 3 of the drawings, a thermocouple jack 215 may be secured to the inner surface of the side wall 80 of the body means, the jack including a probe portion 216 which extends downwardly for measuring the temperature of the fuel elements as hereinafter described.

The leads from this jack (not shown), may extend downwardly within the cavity and thence through the conduit 85 so as to be available through the terminal end 86 of this conduit when it is desired to measure the temperature within the cavity of the body means.

Referring now to FIGS. 1–3 of the drawings, the removable closure means of the present invention is illustrated generally by reference numeral 220 and includes a disc-like plate portion 221 having eight equally spaced holes 220 formed therethrough for receiving the threaded studs 33, plate means 221 also having a pair of diametrically opposite holes 223 for receiving the guide pins 35 previously described.

A substantially frusto-conically shaped member 225 is suitably secured as by welding to the under surface of plate 221, and a flat disc-like plate 226 is suitably secured as by welding to the lower edge of member 225 to form a cavity therewithin, members 225 and 226 defining a downwardly tapered plug portion having a body of lead 230 disposed therewithin. As seen most clearly in FIG. 2, plate 221 is provided with a pair of spaced holes 231 through which lead is adapted to be poured into the space defined by members 225 and 226. After the lead is poured through holes 231, plugs 232 are welded in position as illustrated to seal the plug portion of the closure means.

A substantially rectangular plate 235 is secured as by welding to the upper surface of plate member 221, plate 235 having a central threaded opening 236 formed therethrough adapted to receive the lower threaded shank portion of an I-bolt 238. I-bolt 238 may be removed and attached as desired such that the I-bolt is attached in the position shown in FIG. 3 when it is desired to lift or lower the closure means, the I-bolt being removed when the container is being shipped for example.

A vent means is provided in the closure means, this vent means including a conduit 240 one end of which opens through the side of member 225 as illustrated, the opposite end 241 of which terminates within an opening formed through plate member 235. The open end 241 of the conduit is in communication with a tapered threaded hole 242 provided in plate 235 which is adapted to be closed by a plug member 244 for selectively closing off the vent means as hereinafter explained.

The closure means is illustrated in operative position in FIG. 1, and in this position, the guide pins 35 extend upwardly through the holes 223 in the plate portion 221 while stands 33 extend upwardly through the openings 222 of plate 221 of the closure means, nuts 247 being threaded on the upper ends of studs 33 for fixedly securing the closure means in operative position.

An outrigger means for facilitating handling of the closure means is indicated generally by reference numeral 250, and includes a pair of longitudinally extending side members 251 and 252 which are interconnected by cross brace members 253, 254, 255, and 256, all of these members being rigidly interconnected with one another as by welding or the like.

A pair of similar angle members 260 include leg portions 261 and 262, the leg portions 261 of each of these angle members being suitably secured as by welding to the inner surfaces of side members 251 and 252 of the outrigger, leg portions 262 each being provided with a pair of spaced holes therein which are adapted to be aligned with threaded openings in plate member 235 for receiving screw members 264 which are threaded down into the openings in plate 235 for rigidly attaching the outrigger in operative position on the closure means.

As seen particularly in FIG. 1, a guard member 270 is provided for the relief valve means 119, the guard member being of substantially U-shaped cross-sectional configuration and having a pair of attaching flanges 271 at each side thereof. Each of flanges 271 is provided with a pair of spaced openings formed therethrough for receiving suitable screw members 272 which may be threaded at the suitable tapped openings provided in the side wall portion 21 of the body means.

Referring now particularly to FIG. 15 of the drawings, a lifting fixture is indicated generally by reference numeral 275, this fixture being employed for lifting and lowering the fuel element support means such as shown in FIG. 7. Fixture 275 includes a substantially cylindrical bar 277 having an eye-plate 278 fixed thereto and extending laterally therefrom, the plate having an opening 279 formed therethrough for receiving a suitable lifting means at the end of a crane or the like.

Bar 277 is provided with three pairs of notches, a first pair 280 being provided for securing the lifting hook members hereinafter described in operative position for engaging the fuel element support means which carries two fuel elements, a second pair of slots 281 being provided for securing the lifting hook members in operative position for engaging a fuel element support means which supports five of the fuel elements. A third pair of slots is provided in bar 277, this pair of slots being hidden from view in FIG. 15 since they are being employed for retaining the hub portions 283 of the lifting hook members in operative position for engaging a fuel element support means for supporting six of the fuel elements. The hub portions 283 are provided with radially extending threaded openings which receive the adjusting bolts 285 which may be threaded inwardly to engage within one of the slots in the bar for retaining the lifting hook members in operative position. Extending radially from the opposite side of each of the hub portions is a lifting hook member indicated generally by reference numeral 287 and including at the lowermost ends thereof as seen in FIG. 15 a laterally extending hook-like portion 288 which are adapted to be received within the slot portions 164 and 165 in the upper enlarged portions of the side members of the fuel element support means. It is apparent that when it is desired to lift or lower one of the fuel element support means, the fixture 275 may first be adjusted so that the lifting hook members are in proper position for engaging the desired fuel element support means whereupon the hook portions 288 may be slid into the slots 164 and 165 of the fuel element support means and thence into the upwardly extending portions of such slots such that the fuel element support means will not slip off of the fixture whereupon the apparatus can be lifted and lowered as required.

A brief description of the operation of the apparatus will assist in understanding the relationships and intercooperation between the various components of the apparatus. In order to prepare the apparatus for loading the pressure relief valve 119 is tripped to relieve any differential pressure and to release gas from the interior of the body means. The guard 270 is then removed and the entire vent assembly 100 as shown in FIG. 11 disconnected including removal of the filter assembly.

The closure means is then released by unscrewing nuts 247 and the I-bolt 230 may be threaded into position to enable lifting of the closure means. The plug 244 for the vent of the closure means is then removed and adaptor 92 as well as closure 88 is removed from the outer end of the conduit 85 of the drain means. A hose is then connected to the threaded end 87 of the drain conduit. This step of course is only taken if the apparatus is to be utilized in a pool operation wherein it is necessary to drain liquid out of the bottom of the cavity as hereinafter described.

A crane hook is then engaged with the I-bolt of the closure means and the closure means lifted off of the body means. The fuel element support means are normally not removed from the body means when loading. If the fuel elements have been cropped a length less than that required to engage the support bars of the fuel element support means, the fuel elements may be supported in proper position by placing spacer means 158 on the bottom support member of the fuel element support means.

The body means with the closure means removed and with the fuel element support means in place is then lifted by means of the trunnions 66 and lowered into the loading pool, or carried into a hot cell or other properly shielded loading facility for filling with the fuel elements. The first fuel element is inserted in each fuel element support means with the concave side of the fuel element touching or as close as possible to the vertical side member of the fuel element support means. Additional fuel elements are then placed in the fuel element support means so that they are nested with one another and in contact with each other. The last fuel element inserted in each of the fuel element support means is guided in by the slant end of the fuel element support means. While the fuel elements are being inserted in shipping position, the shipment is tested to determine if it is in a safe condition. After determining that it is safe from a nuclear standpoint, a thermocouple is inserted in the thermocouple jack 215 for measuring fuel cladding temperature. At this time, suitable aluminum top spacer blocks (not shown) are placed on the top of each fuel element support means to prevent vertical movement of the elements in transit, care being taken that the top of these latter spacer blocks do not violate the space within which the downwardly extending tapered plug portion of the closure means is disposed.

After having checked the body means for criticality control, the closure means is guided down carefully so as to engage the two alignment pins whereupon it settles onto the gasket 28 and the studs 33 extend through the holes 222 of the closure means. The nuts 247 are then tightened up to secure the closure means in place. The entire apparatus is then lifted and in the case of a pool operation, all the water within the cavity of the body means drains back into the pool through a syphon drain hose attached to the outer end 87 of the drain conduit 85. In order to ensure removal of all pool water from the cavity of the body means, it may be necessary to attach an air line to threaded opening 242 of the vent in the closure means while closing off the vent conduit 102 so as to blow out all excess water. The apparatus is then checked for external contamination and external radiation whereupon the relief valve and filter assembly is replaced along with the guard means 270 therefor.

The rupture diaphragm 125 is also checked at this time.

An air sample may then be drawn out of the cavity in the body means through conduit 85 to check its activity. The thermocouple probe 216 is designed to be inserted between plates of a central element and the thermocouple lead connector ends are disposed within conduit 85 so that they can be projected therefrom for attachment to a potentiometer. Temperatures are measured within the body means and at the edges of the fins on the body means until equilibrium is reasonably established.

Plug 244 is then inserted to close off the vent means in the closure means. The pressure relief valve will maintain pressure equilibrium within the body means, and the pressure relief valve may be automatically tripped to detect a free flow of air which indicates that the inlet of the conduit 102 to the interior of the cavity has not been closed by seating of the closure means.

The outer end 87 of conduit 85 is then closed by means of closure 88. The apparatus is now ready for shipping.

In unloading the apparatus, the pressure relief valve 119 is first tripped to relieve any differential pressure whereupon the guard and the complete vent assembly 100 along with the filter assembly 105 is removed. The air coolant within the cavity may be sampled through the outer end of conduit 85 by removing the closure 88 therefrom, and the plug 244 is removed from the vent conduit 240 in the closure means. The thermocouple leads may then be projected from the outer end of conduit 85 and connected with a potentiometer to determine the fuel cladding temperatures and to establish if there is any need for cooling the interior of the body means by adding cooling water to the interior of the cavity. In order to avoid thermal shock to the elements and disturbance in an unloading pool, the body means and the fuel should be gradually brought up to the pool temperature since the loaded body means often operates at a fuel temperature which is above the water temperature in the unloading pool.

In order to add cooling water, the adaptor 92 is threaded into operative position and a hose is connected to the portion 96 thereof. Nuts 247 may be removed as emergency pressure release if the cooling water should be added too fast and the pressure should build up faster than the vent lines 240 and 102 can discharge the gas.

Cooling water is then gradually added in the case where a pool operation is involved, and the water is continually added until the desired temperature is reached. The thermocouple may then be disconnected and a drain hose attached to the outer end 87 of drain conduit 85 for draining the cavity after unloading. The outrigger means may then be attached if required for the unloading procedure.

A suitable lifting means such as a crane is then engaged with the trunnions and the entire assembly lowered into an unloading pool. The closure means is then removed and the top spacer blocks removed.

The fixture employed for lifting and lowering the fuel element support means as shown in FIG. 15 is then secured to a suitable lifting mechanism and adjusted for engaging the lefthandmost support means as shown in FIG. 5. An inspection of FIG. 5 will clearly indicate that the fuel element support means must be removed in a certain sequence due to the overlapping relationship of the support bars 170 and 172 thereof, and accordingly, the lefthandmost fuel element support means will be first removed and then the fuel element support means will be removed in sequences toward the right until the righthandmost fuel element support means is the last to be removed. It is of course evident that the fixture 275 will be adjusted for engaging the different size fuel element support means as required. After removing the fuel element support means, the individual fuel elements are removed therefrom, and the empty fuel element support means are then replaced in position within the storage portion of the cavity of the body means.

The closure means can then be replaced on the body means as previously described, and the apparatus lifted and the liquid drained from the interior thereof through the drain conduit 85. This again, of course, is only true in a pool type operation. The apparatus may then be prepared for shipping as previously described.

It is apparent from the foregoing that there is provided a new and novel shipping container for spent fuel elements as employed in nuclear reactors wherein the container meets all present standards of safety as required for this type of apparatus. The arrangement of the present invention permits nesting of the fuel elements in contact with one another to enable more elements to be stored in a given area and thereby resulting in a substantial reduction in shipping cost. The fuel element support means of the present invention provides an open framework for supporting the fuel elements and permitting effective heat transfer through the intermediary of the air cooling medium, and the separator plates of the invention serve to control accidental criticality and also provide an effective heat conduction path to the walls of the body means. The body means also incorporates an additional safety feature in the forward expansion chamber space which prevents damage to the container in case of excessive heat, and avoids loss of lead. The support means within the storage portion of the body means enables the carrying of fuel elements which have failed and which are jacketed in closed containers, these containers of course being substantially larger than the fuel elements themselves. The air cooling system as employed in the present invention eliminates the problems of leakage and freezing with partial loads as has been heretofore encountered with water cooled systems. Venting means is provided for venting excess air pressure and for removing water from the interior of the cavity of the body means, and a particularly advantageous feature of the present invention is the fact that it can be utilized equally well with either pool or dry cell operations or any other properly shielded loading facility. The apparatus of the present invention is quite simple, inexpensive, compact, and yet reliable in operation and economical in shipping fuel elements from one location to another.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. A container for fuel elements utilizing a gas cooling system and comprising body means including shielding material and having a cavity formed therein for receiving fuel elements and being open at the upper portion thereof, removable closure means including shielding material and adapted to close the open upper end of said cavity, means for securing said closure means in operative position, a plurality of plates spaced substantially flat being disposed within said cavity and spaced from one another, said plates being substantially parallel with one another and dividing said cavity into a plurality of substantially rectangular vertically extending spaces for receiving fuel element support means, said plates being operatively connected with the walls of said body means and being formed of neutron absorbing material as well as material having good heat conduction characteristics for conducting heat readily to the walls of said body means from fuel elements disposed therewithin, and fuel element support means adapted to be received within the various spaces defined within said body means and for supporting fuel elements in operative position therewithin, said fuel element support means being of open framework construction to retain the fuel elements in proper operative position and which does not interfere with effective heat transfer from the fuel elements supported thereby.

2. Apparatus as defined in claim 1, wherein said plates are a boral sandwich.

3. Apparatus as defined in claim 1, wherein said plate means is supported within said body means for relative movement with respect thereto so as to accommodate expansion and contraction movements of the plate means.

4. A container for fuel elements comprising body means including shielding material and having a cavity formed therewithin for receiving fuel elements, said cavity opening through the upper portion of said body means, removable closure means including shielding material and including a portion received within the upper part of said cavity in the body means for closing off said cavity, means for securing said closure means in operative position, a plurality of vertically extending plates disposed within said cavity between opposite side wall portions thereof for dividing said cavity into a plurality of spaces for receiving fuel elements, each of said plate means being formed of neutron absorbing material having relatively good heat conduction characteristics, and fuel element support means adapted to be received within each of the spaces defined within said cavity of the body means, each of said fuel element support means comprising a framework including a bottom support member, a pair of side members having the lower ends thereof connected with said bottom support member, a pair of support bars having the opposite ends thereof secured between upper portions of said side members, said support bars being secured to opposite faces of said side members so as to engage portions of fuel elements disposed within the fuel element support means to retain the fuel elements in operative position, said support bars being mounted such that the upper surface of one of said support bars is at substantially the same vertical level as the under surface of the other support bar whereby the fuel element support means may be mounted in close stacked relationship with the support bar of one fuel element support means resting on the support bar of the next adjacent fuel element support means.

5. Apparatus as defined in claim 4, wherein each of said fuel element support means is provided with an adjustable wall engaging means extending laterally therefrom for engaging an adjacent wall portion of the body means.

6. Apparatus as defined in claim 4, wherein each of said fuel element support means has slots formed in the upper portions of the side members thereof for receiving a lifting fixture to facilitate handling of the fuel element support means.

7. A container for fuel elements utilizing a gas cooling system and comprising a body means including shielding material and having a cavity formed therewithin for receiving fuel elements, said cavity opening through the upper portion of said body means, removable closure means including shielding material and being adapted to be received within the upper portion of said cavity for closing said cavity, means for securing said closure means in operative position to close said cavity, a plurality of spaced substantially flat plate means disposed within said cavity and extending substantially parallel with the longitudinal axis of the cavity and body means and dividing said cavity into a plurality of spaces for receiving fuel elements, said plate means being formed of neutron absorbing material which is also a good heat conductor, fuel element support means disposed within each of said spaces defined by said plate means for receiving and supporting fuel elements in operative position within said body means, said fuel element support means comprising an open framework which serves to retain the fuel elements in proper operative position and which does not interfere with effective heat transfer from the fuel elements to the body means, and vent means formed in said body means and extending from said cavity to the exterior of said body means.

8. Apparatus as defined in claim 7, wherein said vent means comprises drain means for draining out fluid from said cavity, said drain means being in communication with the lowermost portion of said cavity.

9. Apparatus as defined in claim 8, wherein said drain means includes an outer end portion opening through the side of said body means, and means for selectively closing off the outer end portion of said drain means to prevent communication between the interior of said body means and the exterior thereof.

10. Apparatus as defined in claim 7, wherein said vent means comprises a pressure relief conduit adapted to communicate with atmosphere, filter means disposed within said conduit, and pressure relief valve means also connected in said conduit for venting the interior of the body means to atmosphere.

11. Apparatus as defined in claim 10, including a rupture diaphragm connected in said conduit and adapted to rupture at a predetermined pressure for venting the interior of the body means to atmosphere.

12. Apparatus as defined in claim 7, wherein said vent means includes drain means in communication with the lowermost portion of said cavity within the body means and opening through the side of said body means, means for selectively closing off said drain means, said vent means also including pressure relief means including a pressure relief conduit, filter means connected in said conduit, a pressure relief valve being connected in said conduit, and a rupture diaphragm also being connected in said conduit.

13. A container for fuel elements comprising a body means including shielding material and having a cavity formed therein for receiving fuel elements, said cavity opening through the upper portion of said body means, removable closure means including shielding material and being adapted to be received within the upper portion of said cavity for closing said cavity, means for retaining said closure means in operative position closing said cavity, a plurality of separator plates disposed within said cavity, said plates being spaced from one another and substantially parallel with one another to divide said cavity into a plurality of vertically extending spaces for receiving fuel elements therewithin, said separator plates being formed of neutron absorbing material which is also a good heat conductor, vent means being in communication with the interior of said cavity and opening through the outer surface of said body means for venting the interior of said body means, and fuel element support means disposed within the spaces defined by said separator plates within said cavity, each of said fuel element support means comprising an open framework for supporting fuel elements therewithin without materially interfering with effective heat transfer from said fuel elements to said body means, said fuel element support means including portions adapted to rest upon the upper edges of said separator plates for supporting said fuel element support means in operative position.

14. Apparatus as defined in claim 13, wherein said closure means includes vent means extending therethrough, one end of said last-mentioned vent means being in communication with the interior of the cavity within said body means and the other end of said last-mentioned vent means opening through the outer surface of said closure means and adapted to vent to atmosphere.

15. Apparatus as defined in claim 13, wherein said first-mentioned vent means includes drain means and pressure relief means, said drain means comprising a conduit having one end in communication with the lowermost portion of said cavity and the opposite end opening through the side of said body means, means for selectively closing said opposite end of the drain means, said pressure relief means comprising a conduit having one end in communication with the interior of said cavity and the opposite end thereof being connected with a pressure relief valve and a rupture diaphragm, filter means being disposed within an intermediate portion of said last-mentioned conduit.

16. Apparatus as defined in claim 13, wherein each of said fuel element support means includes a bottom support member and a pair of side members extending upwardly from said bottom support member, one of said side members sloping downwardly and inwardly relative to said other side member to facilitate insertion of a fuel element in said fuel element support means, a pair of support bars being connected between upper portions of said side members and on opposite faces thereof for engaging fuel elements and retaining them in operative position.

17. A container for fuel elements comprising a substantially cylindrical body means having a cavity formed therein including a lower storage portion and an upper closure receiving portion, said body means incorporating shielding material, means on said body means for attaching a closure means, first vent means comprising drain means including a conduit having one end thereof disposed in communication with the lowermost portion of the storage portion of said cavity, the opposite end of said conduit extending through the outer wall of said body means, means for selectively closing the outer end of said conduit, second vent means comprising pressure relief means including a conduit having one end thereof in communication with the closure receiving portion of said cavity and the opposite end thereof extending through the outer wall of said body means, filter means connected in said last-mentioned conduit, the outer end of said last-mentioned conduit being connected with a pressure relief valve and a rupture diaphragm, removable closure means including a disc-like portion and a downwardly tapered plug portion adapted to be received within the closure receiving portion of the cavity within said body means, said closure means having vent means formed therein and comprising a conduit extending from a side portion of said plug portion and having the opposite end thereof in communication with atmosphere, means for closing said opposite end of said last-mentioned conduit, said closure means including means thereon for securing said closure means in operative position on said body means, means formed on each of said body means and said closure means for lifting the body means and closure means independently of one another, a plurality of separator plates disposed within the storage portion of said cavity and being spaced from one another and substantially parallel with one another for dividing the storage portion of said cavity into a plurality of vertically extending spaces for receiving fuel elements, said separator plates being formed of neutron absorbing material which is also a good heat conductor, a fuel element support means disposed within each of said spaces defined within the storage portion of the cavity in said body means, each of said fuel element support means including a bottom support member, a pair of side members extending upwardly from said bottom support member, and a pair of support bars connected between upper portions of said side members and said support bars being connected to opposite faces of said side members for engaging opposite sides of a fuel element to retain a fuel element in operative position within said fuel element support means, said support bars being mounted at different vertical positions along said side members such that the lower surface of one of said support bars is adapted to rest upon the upper surface of a support bar of an adjacent fuel element support means when said fuel element support means are disposed in operative position within said body means, the under surfaces of certain of said support bars being adapted to rest upon the upper edges of said separator plates for supporting the fuel element support means in operative position.

18. Apparatus as defined in claim 17, wherein said separator plates comprise a boral sandwich.

19. Apparatus as defined in claim 17, wherein said body means is substantially filled with a shielding material, there being provided within said body means a void space, said void space being separated from the shielding material within said body means by a wall means, said last-mentioned wall means including a substantially rigid plate having a plurality of openings formed therethrough, and a frangible plate being disposed in engagement with that face of said last-mentioned place remote from said shielding material whereby said frangible plate is adapted to rupture under adverse conditions to allow the shielding material to flow through said openings into said void space.

20. Apparatus as defined in claim 17, wherein one of the side members of each of said fuel element support means is provided with a laterally extending adjustable wall engaging means for engaging an adjacent wall portion of the body means to prevent side thrust.

21. A container for fuel elements utilizing a gas cooling system and comprising body means including a shielding material, said body means having a cavity formed therein for receiving fuel elements and being open at the top thereof, removable closure means including shielding material for closing the upper portion of said cavity, means for securing said closure means in operative position, a plurality of spaced substantially parallel and flat plates in said cavity and fixedly mounted with respect to said body means for dividing said cavity into a plurality of spaces for receiving fuel elements, said plate means being formed of neutron absorbing shielding material and being a good heat conductor, and a plurality of separate fuel element support means each of which is disposed within one of said spaces and separated from an adjacent support means by one of said plates, said support means being supported for movement with respect to said plates so as to be readily inserted into and removed from operative supporting position in said spaces.

22. Apparatus as defined in claim 21, wherein said fuel element support means includes a bottom support member and a pair of spaced side members, a pair of support members extending between the upper portions of said side members and on opposite faces of said side members for engaging and retaining fuel elements in operative position within said fuel element support means.

23. Apparatus as defined in claim 22, wherein said side members are in non-parallel arrangement with respect to one another with the inner surface of one of said side members tapering downwardly and inwardly toward said bottom support member for facilitating insertion of a fuel element into operative position.

References Cited by the Examiner
UNITED STATES PATENTS

| | | |
|---|---|---|
| 3,046,403 | 7/1962 | Montgomery ______ 250—108 X |
| 3,056,028 | 9/1962 | Mattingly __________ 250—108 |
| 3,073,961 | 1/1963 | Nachbar et al. _______ 250—108 |
| 3,111,586 | 11/1963 | Rogers ____________ 250—108 |
| 3,119,933 | 1/1964 | Allen _____________ 250—108 |

RALPH G. NILSON, *Primary Examiner.*

ARCHIE R. BORCHELT, *Examiner.*